(12) United States Patent
Francis et al.

(10) Patent No.: US 9,610,704 B2
(45) Date of Patent: Apr. 4, 2017

(54) CIRCULAR SAW BLADE GUARD WITH SCRATCH-RESISTANT PANEL

(71) Applicants: Robert Bosch Tool Corporation, Broadview, IL (US); Robert Bosch GmbH, Stuttgart (DE)

(72) Inventors: Noel Francis, Skokie, IL (US); Brady Groth, Chicago, IL (US); Marco Laubach, Wheeling, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 331 days.

(21) Appl. No.: 14/101,851

(22) Filed: Dec. 10, 2013

(65) Prior Publication Data

US 2014/0157608 A1 Jun. 12, 2014

Related U.S. Application Data

(60) Provisional application No. 61/735,591, filed on Dec. 11, 2012.

(51) Int. Cl.
*B27G 19/04* (2006.01)
*B23D 45/16* (2006.01)

(52) U.S. Cl.
CPC ............. *B27G 19/04* (2013.01); *B23D 45/16* (2013.01)

(58) Field of Classification Search
CPC ...... B23D 45/16; B23D 59/006; B27G 19/04; B27B 9/00; Y10T 83/839; Y10T 83/2066
USPC ......... 30/390, 374, 370, 375, 376, 388, 391, 30/514, 516, 124, 128, 286, 295, 389; 83/520, 478, 544, 860, DIG. 1, 397, 83/440.2, 102.1; D8/70, 66, 69, 67
See application file for complete search history.

(56) References Cited

U.S. PATENT DOCUMENTS

| 634,057 | A | * | 10/1899 | Walkeir et al. | ........... H01H 5/06 200/443 |
| 1,397,606 | A | | 11/1921 | Smith | |
| 1,830,579 | A | * | 11/1931 | Wappat | ................ B23D 59/002 30/391 |

(Continued)

FOREIGN PATENT DOCUMENTS

| DE | 824256 C | 12/1951 |
| DE | 19609771 A1 | 6/1998 |
| DE | 19716035 A1 | 10/1998 |

OTHER PUBLICATIONS

International Search Report and Written Opinion corresponding to PCT Application No. PCT/US2013/074443, mailed Mar. 19, 2014 (10 pages).

*Primary Examiner* — Ghassem Alie
(74) *Attorney, Agent, or Firm* — Maginot Moore & Beck LLP

(57) ABSTRACT

A circular saw includes a motor, a blade, a blade guard, and at least one panel. The blade is attached to the motor so as to be driven by the motor during a cutting operation. The blade guard is configured to at least partially cover the blade. The blade guard includes a leading portion and a guard lower edge. The at least one panel is substantially composed of substantially transparent scratch-resistant material and is coupled to the blade guard. The at least one panel is coupled to the blade guard such that a lower edge of the panel is adjacent to the guard lower edge.

15 Claims, 5 Drawing Sheets

(56) References Cited

U.S. PATENT DOCUMENTS

| | | | | |
|---|---|---|---|---|
| 2,795,248 | A | * | 6/1957 | Doerner ................. B27G 19/04 144/251.1 |
| 2,929,419 | A | * | 3/1960 | Johnson ................. B27G 19/02 83/435.11 |
| 3,249,134 | A | * | 5/1966 | Vogl ....................... B27G 19/02 144/251.1 |
| 3,938,251 | A | * | 2/1976 | Kareman ............. B23D 49/167 30/124 |
| 4,253,362 | A | * | 3/1981 | Olson .................. B23D 59/006 144/252.1 |
| 4,450,627 | A | * | 5/1984 | Morimoto ............ B23D 59/002 30/391 |
| 4,507,809 | A | * | 4/1985 | Stepan ..................... A42B 3/26 2/424 |
| 5,327,649 | A | * | 7/1994 | Skinner ................ B23D 59/006 30/124 |
| 5,822,864 | A | | 10/1998 | Campbell et al. |
| D400,417 | S | * | 11/1998 | Moran, II ........................ D8/66 |
| 5,911,482 | A | | 6/1999 | Campbell et al. |
| 6,094,827 | A | * | 8/2000 | Campbell ............. B23D 59/002 30/390 |
| 6,108,912 | A | * | 8/2000 | Radigan ............... B23D 59/006 30/124 |
| 6,237,230 | B1 | | 5/2001 | Campbell et al. |
| 6,276,064 | B1 | | 8/2001 | Campbell |
| 6,502,316 | B2 | | 1/2003 | Campbell et al. |
| 6,543,143 | B2 | | 4/2003 | Moore et al. |
| 7,073,266 | B2 | | 7/2006 | Moore et al. |
| 2007/0180710 | A1 | | 8/2007 | Moore et al. |
| 2012/0090439 | A1 | | 4/2012 | Butler |

\* cited by examiner

CIRCULAR SAW BLADE GUARD WITH SCRATCH-RESISTANT PANEL

CLAIM OF PRIORITY

This application claims priority to U.S. Provisional Application No. 61/735,591, entitled "Circular Saw with a Scratch-Proof Upper Guard Site Window," which was filed on Dec. 11, 2012, the disclosure of which is incorporated herein by reference in its entirety.

TECHNICAL FIELD

The present disclosure relates generally to the field of hand-held power saws and, more particularly, to circular saws having scratch proof windows.

BACKGROUND

Hand-held power circular saws have been popular woodworking tools for many years. In a typical sawing operation, the user begins by marking or otherwise identifying a desired line along which to saw the material to be cut. The user then guides the saw during cutting, manually aligning the blade with the desired line of cut. Maintaining this alignment manually can be difficult because the typical circular saw has a blade guard that obscures the user's view of the blade at the point of cutting and thus impedes the user's ability to accurately align the blade with the desired cutting line.

To assist in the alignment, circular saws are typically provided with a guide slot. The guide slot is usually located on the planar cutting base of the saw, and is positioned in front of, and in line with, the circular saw blade. The user positions the saw so that the line on the material appears in the guide slot. While the provision of such a guide slot does aid the user in proper saw alignment, problems still exist. For example, because the blade is covered by a blade guard, the user cannot see the blade as it exits the material, and therefore cannot directly monitor the travel of the blade.

Circular saws generally include any number of a variety of features meant to address the issues with visibility and alignment to improve the user's efficiency, accuracy, and safety while performing a cutting operation. For example, some circular saws include a transparent portion in the blade guard to allow the user to view the blade as it exits the material, thereby allowing the user to properly guide the blade along the desired cut line. Such a transparent portion in the blade guard assists the user in manually aligning the circular saw blade with the cutting line by providing visibility of the saw blade adjacent to the cutting line. However, transparent portions in current circular saws become scratched by the debris around the saw blade, thereby reducing visibility. Additionally, transparent portions in current circular saws are prone to becoming foggy or dusty during use.

The position of a transparent portion on the blade guard also impacts the ability of the user to see the blade exiting the material. If the transparent portion is positioned too far from the blade, the view of the blade exiting the material will be obscured by debris and chips. However, if the transparent portion is positioned too close to the blade, there is a greater likelihood that flying debris and chips cut by the saw blade will break or damage the transparent portion. Additionally, if the transparent portion is positioned at an angle relative to a light source used to illuminate the workspace, the transparent portion may reflect the light from the light source, reducing the ability of the user to see the blade exiting the material.

Accordingly, there remains a need for transparent portions in the blade guards of circular saws that are scratch proof and maintain transparency while the user performs cutting operations. Additionally, it is desirable that the transparent portions in the blade guards be positioned to optimize the ability of the user to view the blade during cutting operations.

SUMMARY

An improved circular saw facilitates a user's ability to view the saw blade of the circular saw during performance of a cutting operation. To this end, the circular saw includes a motor, which drives the saw blade, and a blade guard, which at least partially covers the saw blade, and at least one panel coupled to the blade guard. The at least one panel is substantially comprised of a substantially transparent scratch-resistant material such that debris and chips generated during use of the circular saw do not scratch the surface of the at least one panel. In another embodiment, the panel comprises an environment-resistant material to avoid other content such as moisture or condensation accumulation on the surface of the panel that may be either caused by hot/cold environmental temperature or the running of the motor during use of the circular saw. In this way, the at least one panel maintains its transparency or clarity over multiple uses of the circular saw. The blade guard includes a leading portion which has a guard lower edge. The at least one panel includes a panel lower edge. The at least one panel is coupled to the blade guard such that the panel lower edge is adjacent to the guard lower edge. This position of the at least one panel optimizes the ability of the user to see the blade during cutting operations.

DETAILED DESCRIPTION

Figure 1:
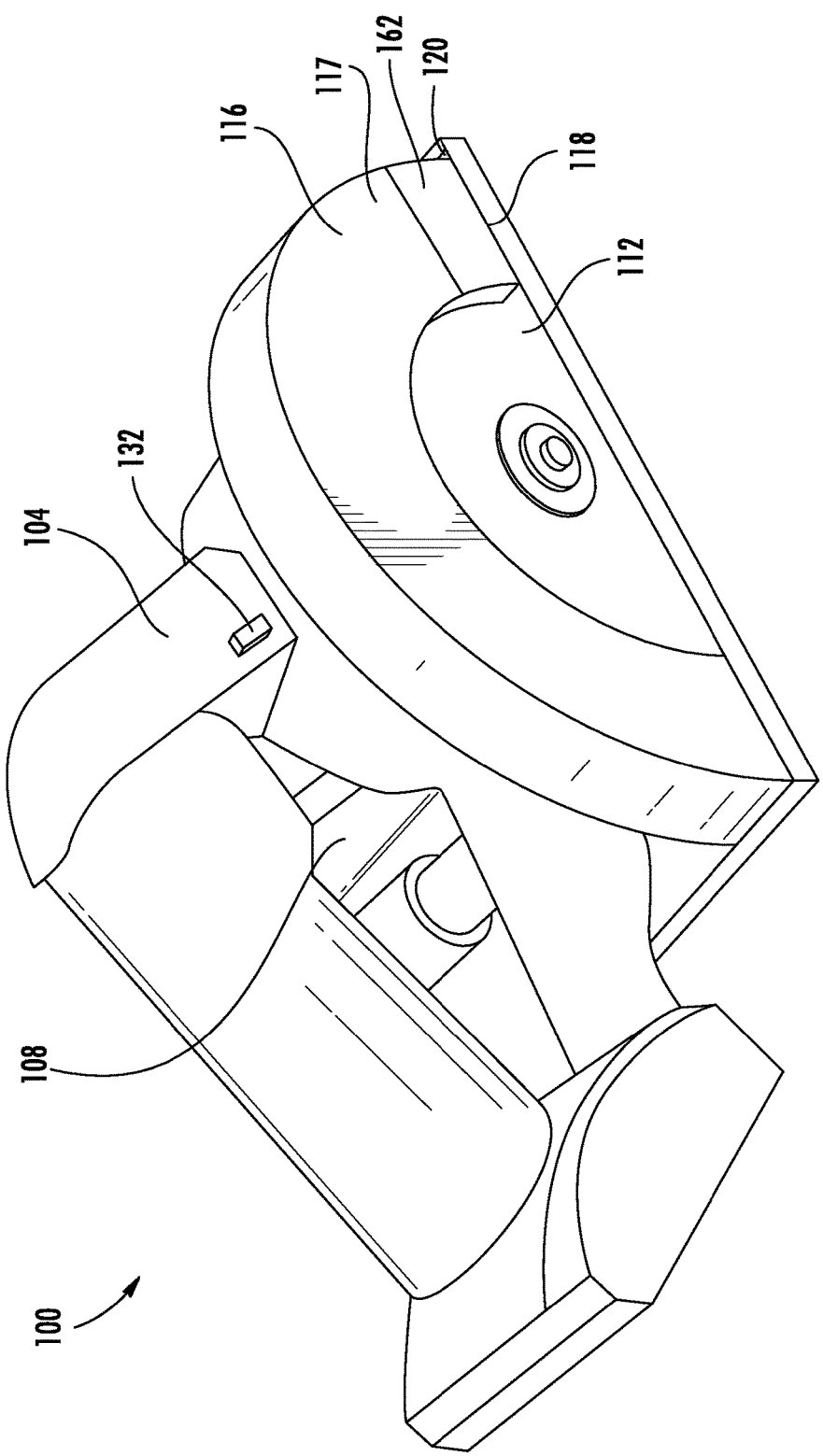
FIG. 1 is a schematic depiction of a circular saw including a blade guard.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

FIG. 1 depicts an embodiment of a cutting tool 100 having a body 104, a motor 108, a saw blade 112, a blade guard 116, and a foot plate 120. The cutting tool 100 can be, for example, a circular saw, a band saw, a miter saw, a bevel saw, a table saw, a jig saw, a scroll saw, a chop saw, or another saw device configured to penetrate into a workpiece. The cutting tool 100 illustrated in FIG. 1, is a circular saw. The body 104, also referred to as a housing, is substantially hollow and houses electrical and mechanical mechanisms which operate the circular saw 100. The motor 108 and the blade guard 116 are connected to opposite sides of the outside of the body 104. The saw blade 112 is operably connected to the motor 108 and is positioned within the blade guard 116 such that the motor 108 causes the saw blade 112 to rotate within the blade guard 116. The foot plate 120 is pivotally mounted to the motor 108 to enable adjustment of the angular orientation of the foot plate 120 relative to the motor 108 in a manner that is well known in the art. The foot plate 120 is configured to conform to and rest upon the surface to be cut in the cutting operation to provide the user with a stable surface to apply pressure while using the circular saw 100.

The body 104 further includes a main trigger 132 positioned substantially within the body 104 but protruding partially outside of the body 104 so as to be accessible to a user. The main trigger 132 is positioned so as to be axially movable relative to the body 104. The main trigger 132 is axially moved when a user applies pressure to the portion of the main trigger 132 positioned outside the body 104. The user actuates the main trigger 132 to operate the motor 108 to perform a cutting operation with the circular saw 100.

The blade guard 116 is positioned atop the foot plate 120 and includes a leading portion 117 which is positioned over the leading edge of the saw blade 112. Accordingly, the leading portion 117 is the first portion of the blade guard 116 to pass over the surface to be cut during a cutting operation. The blade guard 116 also includes a guard lower edge 118 which forms the edge of the blade guard 116 positioned nearest to the surface to be cut in a cutting operation. The guard lower edge 118 does not contact the surface to be cut, however, because the blade guard 116 is separated from the surface to be cut by the foot plate 120 such that the guard lower edge 118 rests atop the foot plate 120. Where the leading portion 117 of the blade guard 116 contacts the foot plate 120, the leading portion 117 includes the guard lower edge 118. The blade guard 116 also includes panels, like panel 162, positioned at the leading portion 117 and adjacent to the guard lower edge 118 to facilitate viewing the saw blade 112 while operating the circular saw 100. The panels are described in more detail below.

The foot plate 120 further includes a blade opening 122 (shown in FIG. 2) and is configured such that the saw blade 112 passes through the blade opening 122 in the foot plate 120 to contact and cut the surface during a cutting operation. The arrangement of the blade guard 116 and the foot plate 120 together substantially covers a top portion of the saw blade 112 and limits access to the sides of the saw blade. Only the portion of the saw blade 112 which contacts the surface to be cut is fully exposed beneath the foot plate 120. This arrangement improves the safety of the circular saw 100 by preventing the user from unintentionally contacting the saw blade 112 above the workpiece. However, this arrangement also limits visibility of the saw blade 112 during a cutting operation.

Figure 2:
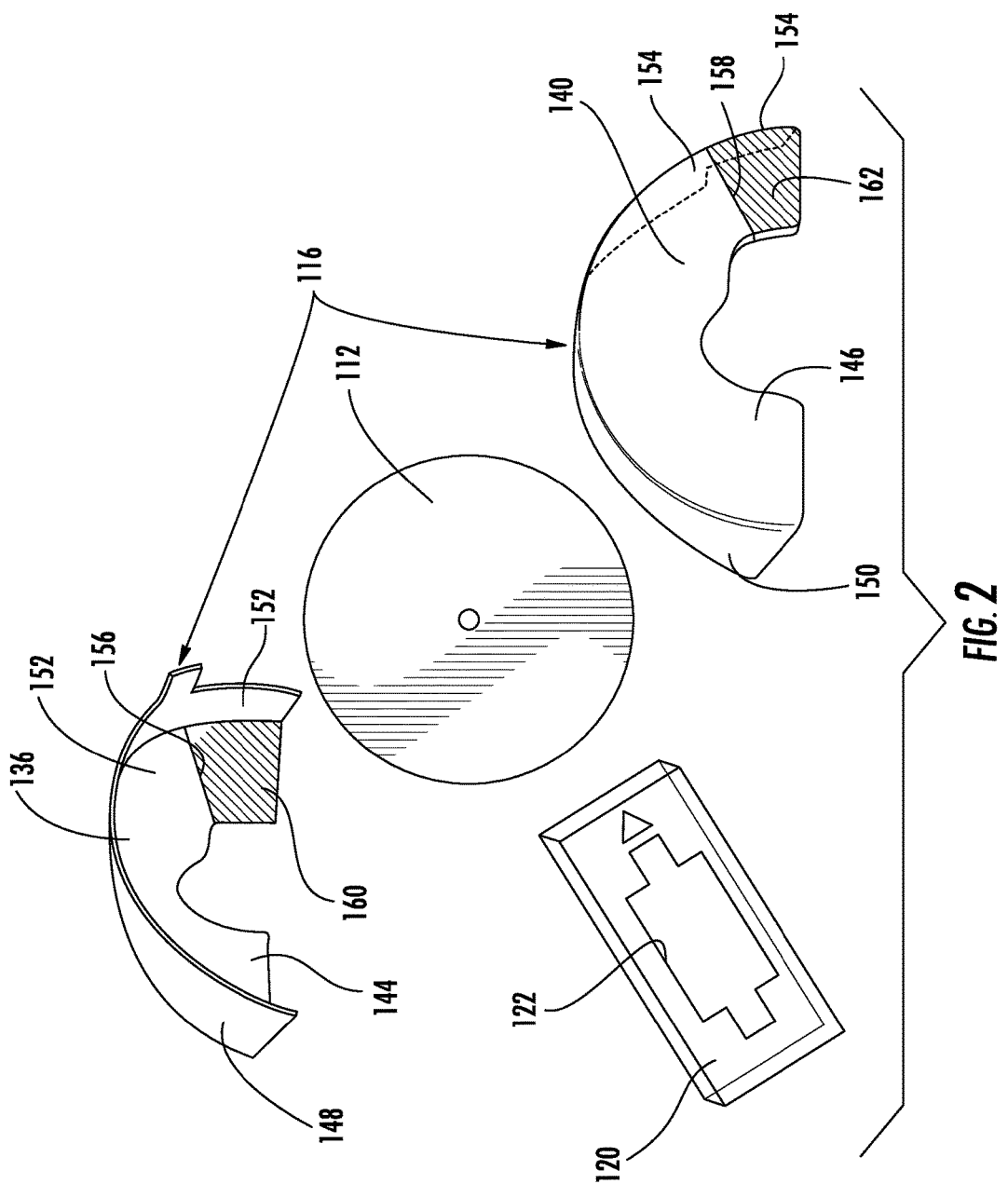
FIG. 2 is an exploded perspective view of the blade guard of FIG. 1 including scratch-resistant panels.

Turning now to FIG. 2, the saw blade 112, the blade guard 116, and the foot plate 120 are shown in an exploded perspective view. The blade guard 116 is substantially comprised of a plastic, such as, for example, polycarbonate. The blade guard 116 can also be substantially comprised of another material with properties similar to polycarbonate. In other words, the blade guard 116 can be substantially comprised of any material that has a high surface hardness, that is easy to produce and mold into particular shapes, and that can withstand repeated impacts of debris and chips without fracturing. The blade guard 116 is substantially translucent or semitransparent such that the user has limited visibility of the saw blade 112 through the blade guard 116.

The blade guard 116 includes a first half portion 136 and a second half portion 140. The first half portion 136 and the second half portion 140 are substantially similar to one another and are arranged so as to mirror one another on opposite sides of the saw blade 112. When the circular saw 100 is assembled as shown in FIG. 1, the first half portion 136 is positioned adjacent to the motor 108 and body 104 (shown in FIG. 1) and the second half portion 140 is positioned spaced apart from the motor 108 and body 104 (shown in FIG. 1) such that the first half portion 136 and the second half portion 140 are arranged so as to mirror one another on opposite sides of the saw blade 112.

The first half portion 136 and the second half portion 140 of the blade guard 116 are sized and configured to accommodate and substantially cover the portion of the saw blade 112 which is positioned above the foot plate 120 when the circular saw 100 is assembled as shown in FIG. 1. Accordingly, the first half portion 136 and the second half portion 140 are configured to matingly fit together to form a hollow semi-circular shield extending from the foot plate 120 up and over the saw blade 112. To this end, the first and second half portions 136, 140 of the blade guard 116 include a first side portion 144 and a second side portion 146, respectively. The first and second side portions 144, 146 are arranged parallel to and spaced apart from the saw blade 112. The first and second half portions 136, 140 of the blade guard also include a first rim portion 148 and a second rim portion 150, respectively. The first and second rim portions 148, 150 extend perpendicularly from the first and second side portions 144, 146, respectively, such that each extends in a direction toward the saw blade 112. The first and second side portions 144, 146 are coextensive with the guard lower edge 118 such that the first and second half portions 136, 140 extend to the foot plate 120. When the first and second half portions 136, 140 of the blade guard 116 are fitted together, the first rim portion 148 mates with the second rim portion 150 above the saw blade 112 and the first side portion 144 is parallel to and spaced apart from the second side portion 146 on opposite sides of the saw blade 112.

The first and second half portions 136, 140 of the blade guard 116 also include a first front portion 152 and a second front portion 154, respectively. The first and second front portions 152, 154 are arranged in a vicinity of the leading portion 117 and the guard lower edge 118 of the blade guard 116 (shown in FIG. 1). The first and second front portions 152, 154 are substantially comprised of a front portion plastic material which allows some light to pass through. The front portion plastic material has the same characteristics and properties as the material which forms the remainder of the blade guard 116, but the front plastic material also passes light through such that the opacity of the material falls in a range from somewhat translucent to transparent. The first and second front portions 152, 154 include a first opening 156 and a second opening 158, respectively, which are configured to receive respective first and second panels 160, 162 that are substantially comprised of a substantially transparent, scratch-resistant material. When the circular saw 100 is assembled as shown in FIG. 1, the first and second panels 160, 162 are parallel to one another on opposite sides of the saw blade 112.

The substantially transparent scratch-resistant material of the first and second panels 160, 162 can be substantially comprised of a glass based or plastic based material. Examples of possible glass based materials which can be used for the first and second panels 160, 162 include, but are not limited to: borosilicate glass, aluminosilicate glass (also known as Gorilla Glass™), sapphire crystal, soda-lime glass, fluoride glass, phosphate glass, and chalcogenide glass. Examples of possible plastic based materials which can be used for the first and second panels 160, 162 include, but are not limited to: acrylic, and glycol-modified polyethylene terephthalate (PETG). Alternatively, the scratch-resistant material can be substantially comprised of any material which has a greater surface hardness than the plastic which forms the blade guard 116. Due to their greater surface hardness, the first and second panels 160, 162 are less easily scratched by cutting debris than the plastic of the surrounding blade guard 116. The first and second panels 160, 162 thus provide improved visibility of the saw blade 112 (shown in FIG. 1) and the workpiece at the site where the user is performing the cutting operation without substantially compromising the strength and durability of the blade guard 116. In at least one embodiment, the scratch-resistant material used in the first and second panels 160, 162 is not only scratch-resistant (which avoids minor scratches), but is further configured to be scratch-proof, which is to say that the material is more durable and capable of withstanding scratches from harder materials at higher force than known scratch-resistant materials. Such a scratch-proof material prevents scratches from the standard blade construction material as well as typical materials being cut. Accordingly, the surface hardness of the scratch-resistant (or scratch-proof) material prevents damage to the first and second panels 160, 162, thereby maintaining their transparency over time.

In the present embodiment, the first and second panels 160, 162 are securely integrally attached to the blade guard 116. Examples of processes which can be used to integrally attach the first and second panels 160, 162 to the blade guard 116 include, but are not limited to: insert molding, gluing, sonic welding, and heat staking. In an alternative embodiment, the first and second panels 160, 162 can be securely attached to the blade guard 116 by mechanical insertion, as shown in FIG. 5 and described in more detail below.

Figure 3:
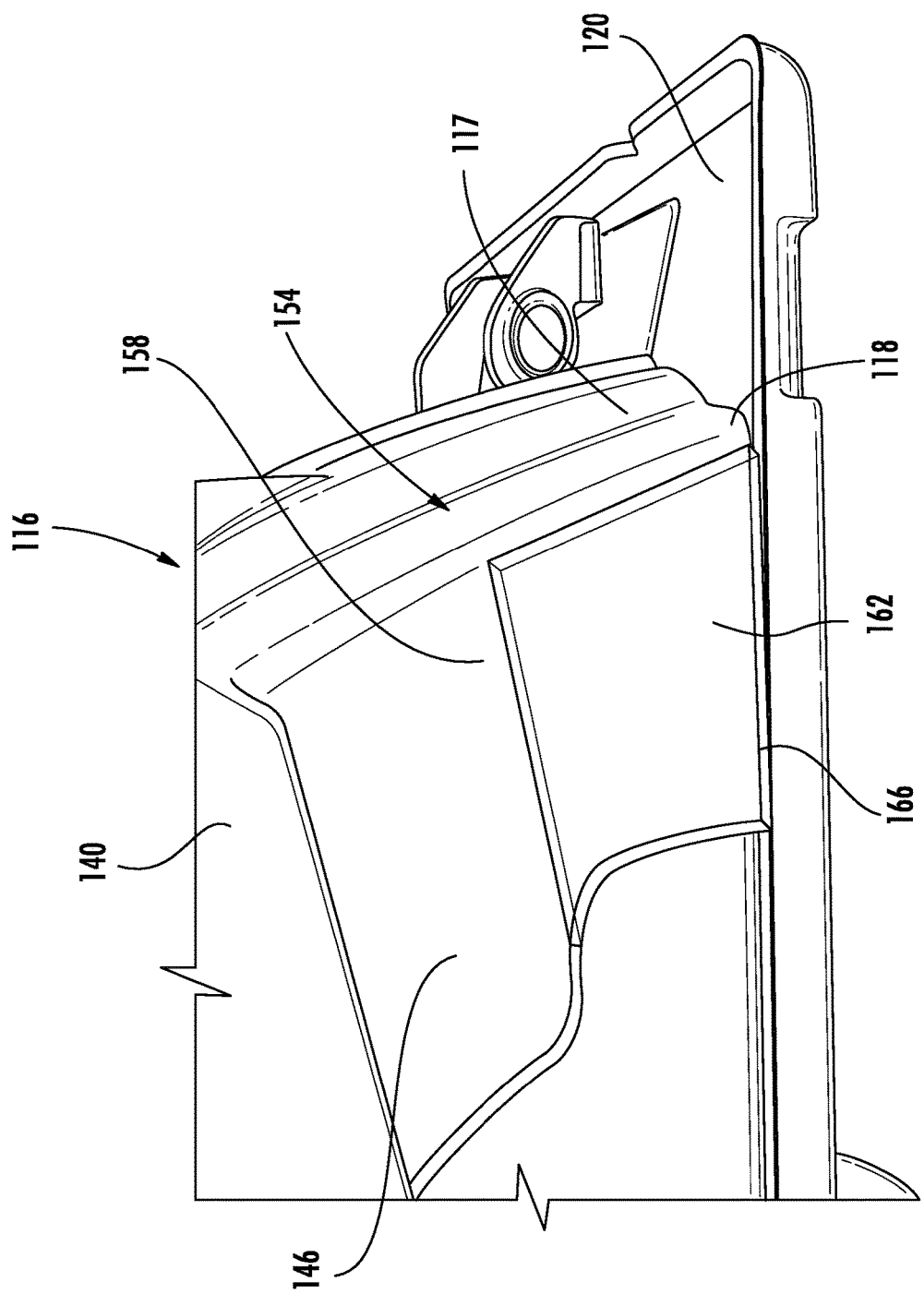
FIG. 3 is a side view of a right side of the blade guard of FIG. 1 including one of the scratch-resistant panels of FIG. 2.

Turning now to FIG. 3, the second front portion 154 and the second panel 162 are shown. The second panel 162 is located at the second front portion 154 and is sized and configured to be received within the second opening 158 so as to be coplanar with the second side portion 146 of the second half portion 140. The second panel 162 also includes a second panel lower edge 166 which is located adjacent to and is coextensive with the guard lower edge 118. Thus, like the blade guard 116, the second panel 162 also extends to and contacts the foot plate 120. The position of the second panel 162 near the leading portion 117 of the blade guard 116 and adjacent to the foot plate 120 enables the user to view the saw blade 112 (shown in FIG. 1) from the right side of the circular saw 100 during a cutting operation.

Figure 4:
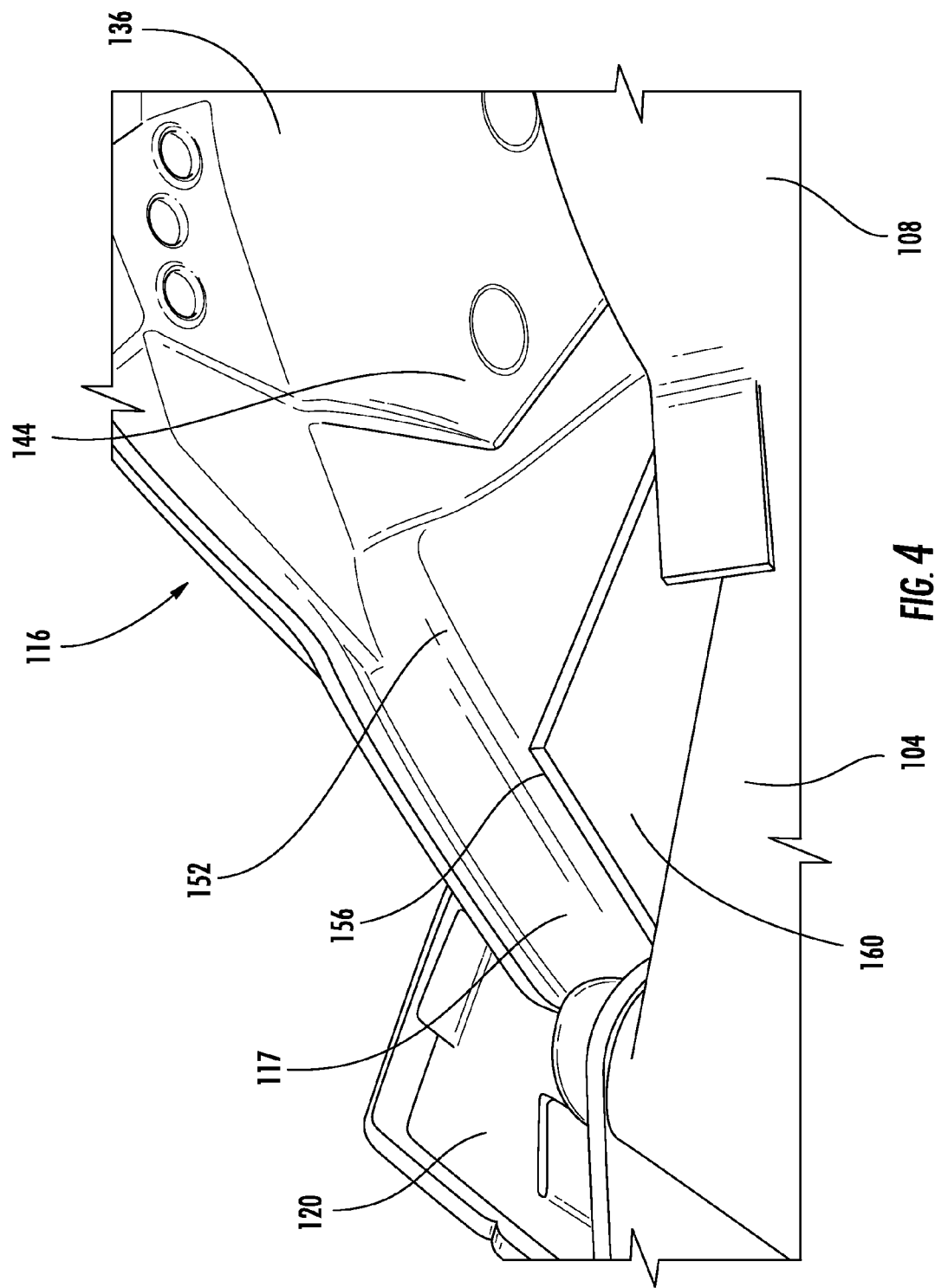
FIG. 4 is a side view of a left side of the blade guard of FIG. 1 including another scratch-resistant panel of FIG. 2.

Turning now to FIG. 4, the first front portion 152 and the first panel 160 are shown. The first panel 160 is located at the first front portion 152 and is sized and configured to be received within the first opening 156 so as to be coplanar with the first side portion 144 of the first half portion 136. The first panel 160 also includes a first panel lower edge (not visible in FIG. 4) which is located adjacent to and is coextensive with the guard lower edge 118 (shown in FIG. 1). As mentioned above, the first half portion 136 of the blade guard 116 is positioned adjacent to the motor 108 and body 104. Accordingly, a portion of the first front portion 152 and a portion of the first panel 160, which includes the first panel lower edge, are obscured by the motor 108 and the body 104 in FIG. 4. While not visible in FIG. 4, like the second panel 162 (shown in FIG. 3), the first panel 160 also extends to and contacts the foot plate 120. The position of the second panel 160 near the leading portion 117 of the blade guard 116 and adjacent to the foot plate 120 enables the user to view the saw blade 112 (shown in FIG. 1) from the left side of the circular saw 100 during a cutting operation.

Figure 5:
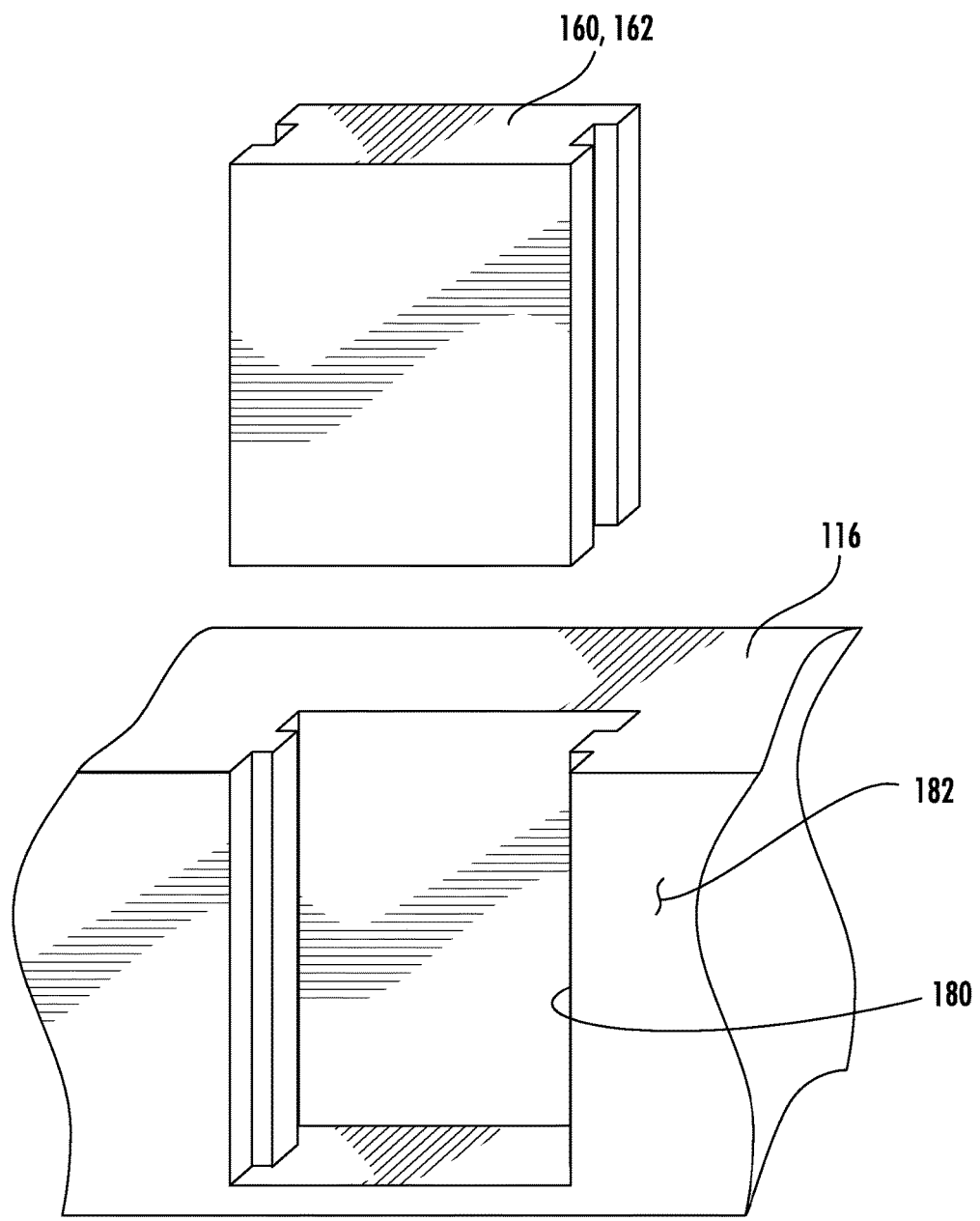
FIG. 5 is a perspective view of scratch-resistant panel of FIG. 2 and a portion of the blade guard of FIG. 1.

Turning now to FIG. 5, in an alternative embodiment, panel insertion pockets 180 (one of which is shown in FIG. 5) are formed in an internal surface 182 of the blade guard 116 and configured to receive the first and second panels 160, 162 therein. In this embodiment, the panel insertion pockets 180 include mating features configured to slidingly mate with complementary features formed in the panels 160, 162 to enable the panels 160, 162 to be easily inserted into the blade guard 116 and securely retained in place within the blade guard 116. One advantage of this embodiment is that it enables removal and replacement of the panels 160, 162 by the user as desired. In an alternative embodiment, the panels 160, 162 can be configured to be press-fitted into the blade guard 116.

In the embodiment shown, the panel insertion pockets 180 are located in the blade guard 116 in place of the first and second openings 156, 158 (shown in FIG. 2). In other words, instead of integrally including scratch-resistant panels in the blade guard 116, scratch-resistant panels are attached only to the inside surface 182 of the blade guard 116. In alternative embodiments, the panel insertion pockets 180 can be formed in other locations in the blade guard 116 and greater or fewer than two panel insertion pockets 180 can be included. In other alternative embodiments, some panels can be integrally included in the blade guard 116 and other panels can be mechanically inserted into panel insertion pockets 180.

The panel insertion pockets 180 are arranged within the blade guard 116 such that the panels 160, 162 are coplanar with the inside surface 182 of the blade guard 116 when received within the panel insertion pockets 180. In at least one embodiment, the panel insertion pockets 180 are configured to be sealed by surrounding the panels 160, 162 within the panel insertion pockets 180 with the plastic material which makes up the blade guard 116. Sealing the panels 160, 162 within the panel insertion pockets 180 prevents the panels 160, 162 from becoming disengaged from the panel insertion pockets 180 and maintains the panels 160, 162 in coplanar position relative to the internal surface 182 of the blade guard 116. In at least one embodiment, the panels 160, 162 can also be overmolded into the panel insertion pockets 180 to retain the panels 160, 162 within the panel insertion pockets 180 an maintain the coplanar positions of the panels 160, 162 relative to the internal surface 182 of the blade guard 116. Sealing the panels 160, 162 within the panel insertion pockets 180 also prevents debris from the saw from entering the panel insertion pockets 180 around the panels 160, 162.

In an alternative embodiment, the circular saw 100 can include a single panel which is positioned in the blade guard 116 so as to extend from the first front portion 152 on the first half portion 136 to the second front portion 154 on the second half portion 140. Like the first and second panels 160, 162, the single panel also extends to and contacts the foot plate 120. The single panel is also substantially comprised of the substantially transparent, scratch-resistant material to prevent scratches and maintain visibility through the single panel. When the user is performing the cutting operation, the single panel can provide visibility of the saw blade 112 from the front of the circular saw 100 in addition to the left and right.

In yet another alternative embodiment, the first and second half portions 136, 140 of the blade guard 116 can include surface portions which are treated with a scratch-resistant coating material. The surface portions can be located in the blade guard 116 in place of the first and second openings 156, 158. In other words, instead of including scratch-resistant panels in the blade guard 116, portions of the blade guard 116 can be treated to be scratch-resistant. Such surface portions extend to the guard lower edge 118 so as to contact the foot plate 120.

While the disclosure has been illustrated and described in detail in the drawings and foregoing description, the same should be considered as illustrative and not restrictive in character. It is understood that only the preferred embodiments have been presented and that all changes, modifications, and further applications that come within the spirit of the disclosure are desired to be protected.

What is claimed is:

1. A circular saw, comprising:
   a motor;
   a blade drivingly attached to the motor;
   a blade guard configured to at least partially cover the blade, the blade guard including a leading portion having a guard lower edge; and
   a plate having a blade opening, the plate positioned beneath the blade guard such that the blade extends through the blade opening and the guard lower edge abuts the plate, wherein:
   the blade guard includes a first side portion having a first panel coupled to the blade guard, said first panel composed of substantially transparent scratch-resistant material, the first panel having a first panel lower edge coextensive with the guard lower edge,
   the blade guard includes a second side portion having a second panel coupled to the blade guard, said second panel composed of substantially transparent scratch-resistant material, the second panel having a second panel lower edge coextensive with the guard lower edge, and
   the first panel and the second panel are parallel to one another and abut the plate.

2. The circular saw of claim 1, wherein the first panel and the second panel are integrally formed with the blade guard.

3. The circular saw of claim 1, wherein the first panel and the second panel are removably attached to the blade guard.

4. The circular saw of claim 1, further comprising a plate having a blade opening, the plate positioned beneath the blade guard such that the blade extends through the blade opening, the at least one panel positioned adjacent to the plate.

5. The circular saw of claim 1, further comprising a housing surrounding the motor, the at least one panel positioned adjacent to the housing.

6. The circular saw of claim 1, wherein:
   the blade guard includes at least one side portion, and
   the at least one panel is coplanar with the at least one side portion.

7. The circular saw of claim 1, wherein:
   the first panel is coupled to a front portion of the first side portion of the blade guard and the second panel is coupled to a front portion of the second side portion of the blade guard.

8. The circular saw of claim 7, wherein:
   the first side portion defines a first surface facing away from the blade and the second side portion defines a second surface facing away from the blade, and
   the first panel is coplanar with the first surface and the second panel is coplanar with the second surface.

9. The circular saw of claim 1, further comprising a housing surrounding the motor, the first panel positioned adjacent to the housing.

10. The circular saw of claim 1, wherein the substantially transparent scratch-resistant material is scratch-resistant glass.

11. The circular saw of claim 1, wherein at least a portion of the blade guard that is in a vicinity of the guard lower edge allows at least some light to pass through.

12. The circular saw of claim 1, wherein at least a portion of the blade guard is substantially comprised of polycarbonate.

13. The circular saw of claim 1, wherein the substantially transparent scratch-resistant material is substantially comprised of one of borosilicate glass, aluminosilicate glass, sapphire crystal, soda-lime glass, fluoride glass, phosphate glass, chalcogenide glass, acrylic, and glycol-modified polyethylene terephthalate.

14. The circular saw of claim 1, wherein:
   the substantially transparent scratch-resistant material has a first material surface hardness,
   the blade guard is at least partially composed of a second material having a second material surface hardness, and
   the first material surface hardness is greater than the second material surface hardness.

15. The circular saw of claim 1, wherein the blade guard includes an internal surface and at least one indentation formed in the internal surface, the at least one indentation configured to receive the at least one panel such that the at least one panel is coplanar with the internal surface.

* * * * *